United States Patent [19]
Venham et al.

[11] Patent Number: 5,767,220
[45] Date of Patent: Jun. 16, 1998

[54] LOW VISCOSITY, ETHYLENICALLY UNSATURATED POLYURETHANES CONTAINING ALLOPHANATE GROUPS

[75] Inventors: Lanny D. Venham, Paden City; Arthur W. Mason, Sisterville; Michael K. Jeffries, Pine Grove, all of W. Va.; Michael J. Dvorchak, Monroeville, Pa.

[73] Assignee: Bayer Corporation, Pittsburgh, Pa.

[21] Appl. No.: 917,797

[22] Filed: Aug. 25, 1997

[51] Int. Cl.$^6$ .................................................. C08G 18/67
[52] U.S. Cl. ................. 528/49; 528/73; 252/182.18; 522/90; 526/301; 560/115; 560/132; 560/158; 560/159
[58] Field of Search .............. 252/182.18; 522/90; 526/301; 528/49, 73; 560/115, 132, 158, 159

[56] References Cited

U.S. PATENT DOCUMENTS

| | | | |
|---|---|---|---|
| 5,128,432 | 7/1992 | Meixner et al. | 528/49 |
| 5,136,009 | 8/1992 | Meixner et al. | 528/49 |
| 5,300,615 | 4/1994 | Meixner et al. | 528/49 |

FOREIGN PATENT DOCUMENTS 2142214  8/1995  Canada.

*Primary Examiner*—Rachel Gorr
*Attorney, Agent, or Firm*—Joseph C. Gil; Thomas W. Roy

[57] ABSTRACT

The present invention relates to ethylenically unsaturated polyurethanes which are substantially free from isocyanate groups and have a) a total content of (meth)acryloyl groups (calculated as C=C, MW 24) of 1 to 20% by weight, b) an allophanate group content (calculated as $N_2C_2HO_3$, MW 101) of 1 to 20% by weight and c) an isocyanurate group content (calculated as $N_3C_3O_3$, MW 126) of up to 18% by weight, in which the allophanate and isocyanurate groups are prepared from aliphatic polyisocyanates.

The present invention also relates to a one-component coating composition containing these ethylenically unsaturated polyurethanes.

20 Claims, No Drawings

LOW VISCOSITY, ETHYLENICALLY UNSATURATED POLYURETHANES CONTAINING ALLOPHANATE GROUPS

BACKGROUND OF THE INVENTION

1. Field of the Invention

This present invention relates to ethylenically unsaturated polyurethanes containing allophanate groups and to the use of these polyurethanes as binders in one-component coating compositions.

2. Description of the Prior Art

Aliphatic polyurethanes that contain acryloyl groups are known and described in U.S. Pat. Nos. 5,128,432, 5,136,009 and 5,300,615 and in DE-A 4,404,616. U.S. Pat. No. 5,128,432 is directed to the preparation of liquid urethane acrylates from monomeric diisocyanates, such as HDI or IPDI. To avoid the formation of solid products, it is necessary to react the monomeric diisocyanate with a mixture of hydroxy acrylates, a mono-functional alcohol containing ester groups (such as trimethylolpropane (TMP) diacetate or diacrylate, which may optionally be alkoxylated) and a saturated, polyhydric alcohol such as TMP.

U.S. Pat. No. 5,136,009 is directed to the preparation of urethane acrylates from trimethyl-HDI by reacting this diisocyanate with a mixture of hydroxy acrylates and saturated, polyhydric alcohols such as TMP. U.S. Pat. No. 5,300,615 discloses that the urethane acrylates from U.S. Pat. No. 5,128,432 become turbid at less than 10° C. This problem is overcome by reacting a mixture of HDI and IPDI with a mixture of hydroxy acrylates, an alkoxylated monofunctional alcohol containing ester groups (such as TMP diacetate or diacrylate, which is alkoxylated), a branched, saturated, mono or dihydric alcohol and optionally a linear, saturated mono or dihydric alcohol.

DE-A 4,404,616 is directed to a coating composition for polycarbonate which contains the reaction product of a low viscosity polyisocyanate, such as a low viscosity HDI trimer, with a hydroxy acrylate. The composition also contains a bis-acrylate as a reactive diluent.

A disadvantage of the compositions described in the U.S. patents is that they are too viscous for use in solvent-free, one-component coating compositions. Attempts to lower the viscosity by directly reacting monomeric diisocyanates, such as HDI or IPDI, with hydroxy acrylates results in the formation of solid products. Attempts to use low viscosity polyisocyanates, such as the HDI trimer described in the German publication, also results in the formation of the solid products in the absence of the reactive diluent.

Accordingly, it is an object of the present invention to provide ethylenically unsaturated polyurethanes which do not suffer from the disadvantages of the prior art. It is an additional object of the present invention to provide ethylenically unsaturated polyurethanes that are suitable for use as binders for one-component coating compositions and have an acceptably low viscosity without the need for organic solvents and reactive diluents that are environmentally objectionable and regulated by the government.

These objects may be achieved with the ethylenically unsaturated polyurethanes according to the present invention, which are described in detail hereinafter.

SUMMARY OF THE INVENTION

The present invention relates to ethylenically unsaturated polyurethanes which are substantially free from isocyanate groups and have a) a total content of (meth)acryloyl groups (calculated as C=C, MW 24) of 1 to 20% by weight, b) an allophanate group content (calculated as $N_2C_2HO_3$, MW 101) of 1 to 20% by weight and c) an isocyanurate group content (calculated as $N_3.C_3.)_3$, MW 126) of up to 18% by weight, in which the allophanate and isocyanurate groups are prepared from aliphatic polyisocyanates.

The present invention also relates to a one-component coating composition containing these ethylenically unsaturated polyurethanes.

DETAILED DESCRIPTION OF THE INVENTION

The ethylenically unsaturated polyurethanes are prepared by reacting a polyisocyanate containing allophanate groups and optionally isocyanurate groups with a hydroxyalkyl (meth)acrylate. The polyisocyanates are obtained in a one or two step process by 1) preparing a compound containing urethane groups and optionally isocyanate groups U by reacting at an NCO:OH equivalent ratio of 2:1 to 120:1

A1) a polyisocyanate component having an NCO content of 20 to 60% by weight and an average NCO functionality of 1.8 to 2.5 and containing one or more aliphatic polyisocyanates with B) an alcohol component having an average hydroxyl functionality of 1.0 to 2.2 and containing one or more monofunctional or polyfunctional alcohols having a molecular weight of 32 to 500, 2) reacting the compound U prepared in 1) with A2) a polyisocyanate component having an NCO content of 20 to (60% by weight and an average NCO functionality of 1.8 to 2.5 and containing one or more aliphatic organic polyisocyanates, at an equivalent ratio of isocyanate groups of component A2) to urethane groups of compound U of at least 3:1 and optionally in the presence of catalysts which accelerate the reaction of urethane groups with isocyanate groups to form allophanate groups and 3) optionally removing at least a portion of excess, unreacted starting polyisocyanates by distillation.

The polyisocyanate component to be used as starting component A1) in the process according to the invention has an NCO content of 20 to 60% by weight, preferably 20 to 50% by weight; and an average NCO functionality of 1.8 to 2.5, preferably 2; and contains at least 70%, preferably at least 90% and more preferably 100% by weight of an aliphatic polyisocyanate, preferably an aliphatic polyisocyanate having 4 to 12 carbon atoms. Suitable aliphatic polyisocyanates include 1,4-diisocyanatobutane, 1,5-diisocyanatopentane, 1,6diisocyanatohexane (HDI), 1,8-diisocyanatooctane, 1,10-diisocyanato-decane, 1,11-diisocyanatoundecane, 1,12-diisocyanatododecane, and 2,2, 4- and 2,4,4-trimethyl-1,6-diisocyanatohexane. Preferably, 1,6-diisocyanatohexane is used as the aliphatic polyisocyanate.

Other polyisocyanates that may be used as starting polyisocyanates in amounts of up to 30%, preferably up to 10% by weight include 1-isocyanato-3,3,5-trimethyl-5-isocyanatomethyl cyclohexane (IPDI), 1,3-diisocyanatocyclobutane, 1,3- and 1,4-diisocyanatocyclohexane, 4,4'-bis-(isocyanato-cyclohexyl)-methane (HMDI), 1,2-bis-(isocyanatomethyl)-cyclobutane, 1,3- and 1,4-bis-(isocyanatomethyl)-cyclohexane, hexahydro-2,4- and/or -2,6-diisocyanatotoluene, bis-isocyanatomethyl norbornane (isomer mixture), 2,5- and 2,6-bis-(isocyanatomethyl)-bicyclo[2.2.1]heptane, 1-isocyanato4(3)-isocyanatomethyl-1-methyl cyclohexane, p-xylylene diisocyanate, 2,3-bis-(8-isocyanatooctyl)-4-octyl-5-hexyl cyclohexane and mixtures thereof Preferably, component A1) is exclusively selected from aliphatic diisocyanates, more preferably HDI.

Polyisocyanate component A2) is an organic polyisocyanate or polyisocyanate mixture selected from the suitable polyisocyanates previously set forth for use as polyisocyanate component A1). The distinction between polyisocyanates A1) and polyisocyanates A2) is necessary because, even though both polyisocyanates are selected from the same polyisocyanates, polyisocyanate component A2) does not have to be the same as polyisocyanate component A1). Polyisocyanate component A2) is either the excess of starting polyisocyanate A1) present in the reaction mixture after urethane formation from components A1) and B), or an additional polyisocyanate—added after urethane formation—which may differ from polyisocyanate A1). Depending upon the NCO/OH equivalent ratio used to prepare compound U, the different polyisocyanate component A2) may either be present alone or in admixture with excess starting polyisocyanate A1).

Component B) is selected from an alcohol component having an average hydroxyl functionality of 1.0 to 2.2, preferably 1.0 to 1.8, more preferably 1 to 1.2 and most preferably 1, and containing one or more monofunctional or polyfunctional alcohols having a molecular weight of 32 to 500, preferably 32 to 300. Preferably alcohol component B) is selected from saturated alcohols.

Suitable monoalcohols have been disclosed in U.S. Pat. Nos. 5,124,427, 5,208,334 and 5,235,018, the disclosures of which are herein incorporated by reference Examples include methanol, ethanol, n-propanol, isopropanol, methoxypropanol, the isomeric butanols, pentanols and hexanols, n-heptanol, n-octanol, n-nonanol, n-decanol, n-dodecanol, n-octadecanol, saturated fatty alcohols and mixtures thereof. Suitable polyhydric alcohols include ethylene glycol, propane-1,2- and -1,3-diol, butane-1,4- and -1,3-diol, hexane-1,6-diol, octane-1,8-diol, nonane-1,9-diol, decane-1,10-diol, dodecane-1,12-diol, octadecane-1,18-diol, neopentyl glycol, 1,4-bis-hydroxymethyl cyclohexane, 2-methylpropane-1,3-diol, 2,2,4-trimethyl-pentane-1,3-diol, 2-ethylhexane-1,3-diol, glycerol, trimethylol propane, trimethylol ethane, the isomeric hexanetriols, pentaerythritol, sorbitol and mixtures of these saturated alcohols.

Alcohol component B1) may also contain ether- or ester-functional alkoxylation products of the previously described alcohols, provided that such alkoxylation products satisfy the requirements of component B). The use of such alkoxylation products is less preferred.

The process for preparing the polyisocyanates containing allophanate groups and optionally isocyanurate groups according to the invention may be carried out by reacting components A1) and B) at an NCO/OH equivalent ratio of 1:1 to 120:1, preferably 4:1 to 120:1, more preferably 6:1 to 60:1 and most preferably 8:1 to 30:1 in either a one or two step process to initially form urethane groups and subsequently the products according to the invention containing allophanate groups. This reaction generally takes place at a temperature of 30° to 200° C. and preferably at a temperature of 50° to 160° C., the temperature gradually being increased within these ranges. Known catalysts for accelerating the allophanatization reaction between urethane and isocyanate groups and optionally also promoting the formation of isocyanurate groups are preferably used at least during the oligomerization reaction.

Suitable catalysts include trimethylamine, tributylamine, N,N,N'N'-tretramethylbutyl-1,4-diamine, bis (dimethylamino)ethyl ether, dimethyl ethanolamine, 1,4-diaza-bicyclo[2.2.2]octane, diazobicycloundecene, N,N-dimethylbenzylamine, 1- and 2-methyl imidazole, tris (dimethylamino-methyl)-phenol, pyridine, Mannich bases, morpholines, tetraalkyl-ammonium hydroxides, trimethyl benzylammonium hydroxide and alkali metal hydroxides (such as sodium hydroxide), alkali metal phenolates, metal salts (such as iron(III) chloride, potassium octoate, aluminum tri(ethylacetoacetate), zinc acetyl acetonate and zinc octoate), tin compounds (such as tin(II) octoate, tin(II) ethylhexanoate, tin(II) laurate, dibutyl tin oxide, dibutyl tin dichloride, dibutyl tin diacetate, dibutyl tin dilaurate, dibutyl tin maleate and dioctyl tin diacetate) and mineral acids (such as sulfuric acid, hydrochloric acid, phosphoric acid and perchloric acid). These catalysts are generally used in quantities of 0 to 5% by weight, based on the reaction mixture.

The reaction according to the invention may also be carried out in two stages by initially reacting components A1) and B) in a preliminary reaction at temperatures of up to 120° C. to form the corresponding products containing urethane groups, followed by allophanatization at elevated temperatures of up to 200° C., preferably up to 160° C.

At a temperature of about 50° C. and in the presence of the required catalyst or catalyst solution the allophanatization reaction begins and is indicated by an exothermic reaction. When catalysts for the formation of allophanate groups and isocyanurate groups are present, it is possible to control the rate of formation of the these two groups. As the reaction temperature increases the conversion rate of urethane groups to allophanate groups increases faster than the formation of isocyanurate groups. Accordingly, by varying the reaction temperature, it is possible to obtain different ratios of allophanate groups to isocyanurate groups.

In the one step process polyisocyanate component A2) corresponds to the excess of unreacted starting polyisocyanate A1), which is still present after urethanization reaction. In accordance with the two step process it is possible, although not necessary, to use a mixture of unreacted excess starting polyisocyanate A1) and an additional starting polyisocyanate added after urethanization as polyisocyanate component A2). Preferably, the polyisocyanates containing allophanate groups and optionally isocyanurate groups are prepared in a one step process using 1,6-diisocyanatehexane as the starting polyisocyanate.

After preparation of the polyisocyanates containing allophanate groups, it is preferred, although not necessary to remove a portion of the excess distillable starting diisocyanate by distillation, preferably by thin-layer distillation. After removal the monomer content should be less than 2% by weight, preferably less than 0.5% by weight.

The polyisocyanates containing allophanate groups and optionally socyanurate groups have a) an NCO content of 10 to 35%, preferably 10 to 25% and more preferably 12 to 22% by weight, b) an allophanate group content (calculated as $N_2C_2HO_3$, MW 101) of 1 to 30%, preferably 5 to 30% and more preferably 5 to 20% by weight, c) an isocyanurate group content (calculated as $N_3,C_3, O_3$, MW 126) of up to 25% by weight, preferably up to 20% by weight and d) an average functionality of 2 to 4, preferably 2.2 to 3.3.

When using allophanatization/trimerization catalysts, the polyisocyanate mixtures will generally have an isocyanurate group content of at least 5%, preferably at least 10% by weight. Even when using highly selective allophanatization catalysts, minor quantities of isocyanurate groups are formed. When less selective allophanatization catalysts are used, the ratio of monoisocyanurate groups to monoallophanate groups in these polyisocyanates is preferably about 10:1 to 1:10, more preferably about 5:1 to 1:7. These values may be determined by gel permeation chromatography (GPC) by determining the areas under the peaks for the monoisocyanurate and monoallophanate groups. In accordance with the present invention the term "monoisocyanurate" means a polyisocyanate containing one isocyanurate group and formed from three diisocyanate molecules, and the term "polyisocyanurate" means a polyisocyanate containing more than one isocyanurate group. The term "monoallophanate" means a polyisocyanate containing one allophanate group and formed from two diisocyanate molecules and 1 monoalcohol molecule, and the term "polyallophanate" means a polyisocyanate containing more than one allophanate group.

The ethylenically unsaturated polyurethanes according to the invention are prepared by reacting the previously described polyisocyanates with hydroxy-functional compounds containing (meth)acryloyl groups, i.e., hydroxyalkyl esters of acrylic or methacrylic acid containing 1 to 8 carbons in the alkyl group, such as the 2-hydroxy-ethyl, 2-hydroxypropyl, and 2-, 3- or 4-hydroxybutyl esters of the acrylic or methacrylic acid.

While the hydroxyalkyl (meth)acrylates are preferably used to react with the isocyanate groups of the polyisocyanates, minor amounts (i.e., up to 30 mole percent, preferably up to 20 mole percent) of other hydroxy-functional ethylenically unsaturated compounds may also be used.

Examples of other hydroxy-functional, preferably monohydroxy-functional, ethylenically unsaturated compounds include $\beta,\gamma$-ethylenically unsaturated ether alcohols, preferably having 5 to 14 carbon atoms and containing at least one, preferably at least two, $\beta,\gamma$-ethylenically unsaturated ether groups, such as allyl alcohol, glycerol diallyl ether, trimethylol propane diallyl ether and pentaerythritol triallyl ether; hydroxyalkyl vinyl ethers such as 2-hydroxyethyl vinyl ether and 4-hydroxybutyl vinyl ether; reaction products of (meth)acrylic acids with monoepoxide compounds; addition products of 1 or more moles of $\epsilon$-caprolactone with 1 mole of the hydroxyalkyl (meth) acrylic esters; and alkoxylation products of these hydroxyalkyl (meth)acrylic esters, preferably with propylene or ethylene oxide, more preferably with propylene oxide.

The properties of the unsaturated polyurethanes can be modified by the choice of the unsaturated alcohol. For example, polyisocyanates reacted with hydroxyalkyl (meth) acrylates will result in harder coatings than polyisocyanates modified with addition products of $\epsilon$-caprolactone and hydroxyalkyl (meth)acrylic esters or with alkoxylation products of these hydroxyalkyl (meth)acrylic esters.

The ethylenically unsaturated polyurethanes according to the invention are substantially free from isocyanate groups and have a) a total content of ethylenically unsaturated groups of (calculated as C=C, MW 24) of 1 to 20%, preferably 3 to 15% and more preferably 5 to 15% by weight, b) an allophanate group content (calculated as $N_2C_2HO_3$, MW 101) of 1 to 20%, preferably 3 to 15% and more preferably 5 to 15% by weight and c) an isocyanurate group content (calculated as $N_3C_3,O_3$, MW 126) of up to 18% by weight, preferably up to 12% by weight.

The ethylenically unsaturated polyurethanes generally have a viscosity at 25° C. of less than 100,000 mPa.s, preferably less than 50,000 mPa.s. Preferably, these viscosities are obtained for the neat resins, i.e., in the absence of solvents or copolymerizable monomers.

Prior to their use in coating compositions the ethylenically unsaturated polyurethanes may be blended with known additives. Examples of these additives include wetting agents, flow control agents, antiskinning agents, antifoaming agents, matting agents, (such as silica, aluminum silicates and high-boiling waxes), viscosity regulators, pigments, dyes, UV absorbers and stabilizers against thermal and oxidative degradation.

Other additives include organic solvents and/or copolymerizable monomers, preferably copolymerizable monomers. Examples of suitable solvents include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof.

Copolymerizable monomers are selected from organic compounds which contain at least one copolymerizable olefinic double bond, preferably 2 or more double bonds, and preferably have a viscosity of not more than 1000, more preferably not more than 500 mPa.s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylol-propane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The inert solvents and copolymerizable monomers are present in amounts of up to 200% by weight, preferably up to 100% by weight and more preferably up to 20% by weight, based on resin solids.

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

After the evaporation of any inert solvents used, the coatings may be crosslinked either by high-energy radiation, such as UV light, electron beams or $\gamma$ rays, by heating to elevated temperatures in the presence of peroxides or azo compounds, or by curing with metal salts of siccative acids and optionally (hydro)peroxides at either elevated temperatures or at temperatures of room temperature or below.

When the coatings are crosslinked by UV irradiation, photoinitiators are added to the coating composition. Suitable photoinitiators are known and include those described in the book by J. Korsar entitled "Light-Sensitive Systems", J. Wiley & Sons, New York - London - Sydney, 1976, and in Houben-Weyl, Methoden der organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80° to 240° C., preferably 120° to 160° C., are needed to cure the coating compositions at elevated temperatures.

Suitable initiators include the known free-radical initiators, e.g., aliphatic azo compounds such as azodiisobutyronitrile, azo-bis-2-methyl-valeronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydro-peroxide; and dialkyl peroxides such as dicumyl peroxide, tert-butyl cumyl peroxide or ditertbutyl peroxide.

The coating compositions according to the invention may also be cured at room temperature in the presence of siccatives and optionally (hydro)peroxides, provided that a portion of the isocyanate groups have been reacted with β,γ-ethylenically unsaturated ether alcohols. Acryloyl groups cannot be cured by this method; however, once the allyl ether groups have been initiated, they can react with the (meth)acryloyl groups.

Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic 25 solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethyl-hexane-2,5-hydeoperoxide and diisopropyl benzene monohydro-peroxide. The (hydro)peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example −5° C.) or more quickly at higher temperatures of up to 130° C.

The following examples and comparison examples are intended to illustrate the invention without limiting it in any way. All quantities in "parts" and "%" are by weight unless otherwise indicated.

EXAMPLES

Polyisocyanate 1 - HDI 1,6-diisocyanatohexane, NCO content 50.0%, viscosity <20 mPa.s at 25° C.

Polyisocyanate 2 - IPDI 1-isocyanato-3,3,5-trimethyl-5-isocyanatomethyl cyclohexane, NCO content 37.8%, viscosity <20 mPa.s at 25° C.

Polyisocyanate 3 - HMDI 4,4'-bis-(isocyanato-cyclohexyl)-methane, NCO content 32.0%, viscosity 20 to 40 mpa.s at 25° C.

Polyisocyanate 4—Low viscosity polyisocyanate containing uretdione and isocyanurate groups and prepared from HDI A mixture containing 70 parts by weight of a uretdione group-containing polyisocyanate, i.e., dimerized 1,6-hexamethylene diisocyanate and 30 parts by weight of N,N',N''-tris-(6-isocyanatohexyl)-isocyanurate together with minor quantities of higher homologs of both products. In its 100% solvent free form, the polyisocyanate had an average viscosity of 195 mPa.s at 25° C. and an average NCO content of 20.0% (available from Bayer Corp. as Desmodur N 3400).

Polyisocyanate 5—Low viscosity polyisocyanate containing allophanate and isocyanurate groups and prepared from HDI A polyisocyanate was prepared by polymerizing 100 parts of HDI and 6 parts of 1-butanol at 110° C. in the presence of a solution of 0.06 parts of an 11% solution of benzyltrimethyl ammonium hydroxide in 1-butanol to form isocyanurate and allophanate groups. The crude reaction product had an isocyanate content of 35.0%. The free monomer was removed under vacuum (100 to 220 mtorr) at 160° C. using a wiped film evaporator. The final product, which was obtained in a yield of 48.8%, had an isocyanate content of 19.3% by titration, a free HDI content of 0.16% by weight and a viscosity of 395 mPa.s at 25° C.

Polyisocyanate 6—Low viscosity polyisocyanate prepared by blending Polyisocyanates 4 and 5

A polyisocyanate was prepared by blending polyisocyanates 4 and 5 in a weight ratio of 1:1. The resulting mixture had an isocyanate content of 19.7% by titration, a free HDI content of less than 0.5% by weight and a viscosity of about 300 mPa.s at 25° C.

Polyisocyanate 7—Low viscosity polyisocyanate containing isocyanurate groups and prepared from HDI A low viscosity, isocyanurate group-containing polyisocyanates prepared from HDI and having an isocyanate content of 23.0% by titration, a free HDI content of less than 0.5% by weight and a viscosity of 1150 mPa.s at 25° C. (available from Bayer AG as Desmodur LS 2025).

Polyisocyanate 8—Low viscosity polyisocyanate containing allophanate and isocyanurate groups and prepared from HDI A polyisocyanate was prepared by polymerizing 100 parts of HDI and 2.0 parts of 1-butanol at 110° C. in the presence of a solution of 0.023 parts of an 11% solution of benzyltrimethyl ammonium hydroxide in 1-butanol to form isocyanurate and allophanate groups. The crude reaction product had an isocyanate content of 38.5%. The free monomer was removed under vacuum (100 to 220 mtorr) at 160° C. using a wiped film evaporator. The final product, which was obtained in a yield of 37%, had an isocyanate content of 21.0% by titration, a free HDI content of 0.05% by weight and a viscosity of 1150 mPa.s at 25° C.

Polyisocyanate 9—Polyisocyanate containing isocyanurate groups and prepared from HDI An isocyanurate group-containing polyisocyanate prepared from HDI and having an isocyanate content of 21.7%, a free HDI content of less than 0.5% and a viscosity of 3930 mPa.s at 20° C. (available from Bayer Corp. as Desmodur N 3300).

Polyisocyanate 10—Low viscosity polyisocyanate containing allophanate and isocyanurate groups and prepared from IPDI A polyisocyanate was prepared by polymerizing 100 parts of IPDI and 11.09 parts of 1-butanol at a temperature of 80° to 100° C. in the presence of 0.27% of stannous octoate to form allophanate groups and a minor amount of isocyanurate groups. After cooling the final product had an isocyanate content of 22.5% by titration, a free IPDI content of about 30% by weight and a viscosity of 2440 mPa.s at 25° C.

Polyisocyanate 11—Low viscosity polyisocyanate containing allophanate and isocyanurate groups and prepared from HMDI A polyisocyanate was prepared by polymerizing 100 parts of HMDI and 9.41 parts of 1-butanol in the presence of 0.23% of stannous octoate at a temperature of 110° C. to form allophanate groups and a minor amount of isocyanurate groups. After cooling the final product had an isocyanate content of 19.5% by titration, a free HMDI content of about 30% by weight and a viscosity of 24,400 mPa.s at 25° C.

Polyisocyanate 12—Low viscosity polyisocyanate containing allophanate and isocyanurate groups and prepared from HDI A polyisocyanate was prepared by polymerizing 100 parts of HDI and 11 parts of 1-butanol at a temperature of 100° C. in the presence of 0.02% of stannous octoate to form allophanate groups and a minor amount of isocyanurate groups. The crude reaction product had an isocyanate content of 33.1%. The free monomer was removed under vacuum (100 to 220 mtorr) at 160° C. using a wiped film evaporator. The final product had an isocyanate content of 16.9% by titration, a free HDI content of less than 0.5% by weight and a viscosity of 202 mPa.s at 25° C.

Examples 1–12—Preparation of ethylenically unsaturated polyurethanes

A round bottomed flask was charged with one equivalent of polyisocyanate and 0.01%, based on the weight of the final product, of dibutyltin dilaurate. The flask was equipped with an overhead stirrer, nitrogen inlet, thermocouple, temperature controller, heating mantle and condenser. One equivalent of a hydroxyalkyl (meth)acrylate was then incrementally added to the stirred flask under a nitrogen blanket such that the temperature did not exceed 60° C. After the addition was complete the temperature was maintained at 60° C. for two hours until the isocyanate content was less than 0.5% by weight as determined by titration. The polyisocyanate and hydroxyalkyl (meth)acrylate as well as the viscosities and the calculated ethylenically unsaturated group contents (C=C, MW 24) of the resulting urethane acrylates are set forth in the following Table.

| Polyisocyanate from Example | Viscosity @ 25° C. (mPa · s) Unsaturated End Group | | Unsaturated Group Content (%, C=C) | | Allophanate group content (%) |
|---|---|---|---|---|---|
| | HEMA | HEA | HEMA | HEA | 0 |
| 1 (Comp) | Solid | Solid | 11.2 | 12.0 | 0 |
| 2 (Comp) | — | >200,000 | — | 10.6 | 0 |
| 3 (Comp) | Solid | Solid | 9.2 | 9.7 | 0 |
| 4 (Comp) | 21,700 contained crystals | 21,800 contained crystals | 7.1 | 7.4 | 0 |
| 5 | 41,400 | 33,300 | 6.9 | 7.2 | 11.9 |
| 6 | — | 33,000 | — | 7.3 | 6.0 |
| 7 (Comp) | — | crystallized | — | 8.0 | 0 |
| 8 | — | 94,000 | — | 7.4 | 7.3 |
| 9 (Comp) | — | >200,000 | — | 7.7 | 0 |
| 10 (Comp) | >200,000 | >200,000 | 7.6 | 8.0 | 13.6 |
| 11 (Comp) | Solid | Solid | 7.2 | 7.5 | 11.7 |
| 12 | — | 18,400 | — | 7.5 | 15.7 |

The preceding table demonstrates that only by using polyisocyanates containing allophanate groups is it possible to prepare low viscosity, liquid ethylenically unsaturated polyurethanes. The use of other types of polyisocyanates results in ethylenically unsaturated polyurethanes, which are either solid or contain solids, or have an unacceptably high viscosity.

Examples 13–18—Coatings prepared from unsaturated polyurethanes

Coatings were prepared from the unsaturated polyurethanes of Examples 5, 8 and 12 using one or both of the following formulations:

Formulation 1: 80 parts of unsaturated polyurethane 16 parts of trimethylolpropane triacrylate 4 parts of 2-hydroxy-2-methyl-1-phenylpropan-1-one (Darocur 1173, available from Ciba-Geigy)

Formulation 2: 35 parts of unsaturated polyurethane 15 parts of trimethylolpropane triacrylate 50 parts of tripropylene glycol diacrylate 2 parts of 2-hydroxy-2-methyl-1-phenylpropan-1-one (Darocur 1173, available from Ciba-Geigy) 2 parts of a mixture of 1-hydroxyl cyclohexyl phenyl ketone and benzophone (Irgacure 500, available from Ciba-Geigy)

The formulations were drawn down onto glass panels at a wet film thickness of 3 mils and UV cured by passing under a 300 watt bulbs at a height of 15 cm. Formulation 1 was either cured in 1 pass at a speed of 2 m/min, which corresponded to ~1900 mJ/cm$^2$, or in 2 passes at a speed of 2m/min, which corresponded to ~3800 mJ/cm$^2$. Formulation 2 was cured in 1 pass at a speed of 3.7 m/min, which corresponded to ~1100 mJ/cm$^2$. The unsaturated polyurethane, formulation, number of passes and pendulum hardness are set forth in the following table:

| | Unsaturated | | Pendulum Hardness (sec) | | | | |
|---|---|---|---|---|---|---|---|
| Example | Polyurethane from Example | Formulation | Initial | 1 day | 4 days | 7 days | 14 days |
| 13 | 6/HEA | 1 | 99 | 101 | 108 | 112 | 117 |
| 14 | 6/HEA | 1 | 106 | 105 | 109 | 120 | 118 |
| 15 | 6/HEA | 2 | 143 | 143 | 145 | 146 | 151 |
| 16 | 6/HEMA | 1 | 86 | 84 | 86 | 97 | 90 |
| 17 | 6/HEMA | 1 | 130 | 122 | 121 | 128 | 132 |
| 18 | 6/HEMA | 2 | 109 | 106 | 118 | 124 | 114 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated polyurethane which is substantially free from isocyanate groups and has
   a) a total content of (meth)acryloyl groups (calculated as C=C, MW 24) of 1 to 20% by weight.
   b) an allophanate group content (calculated as $N_2C_2HO_3$, MW 101) of 1 to 20% by weight and
   c) an isocyanurate group content (calculated as $N_3,C_3, O_3$, MW 126) of up to 18% by weight, in which the allophanate and isocyanurate groups are prepared from an aliphatic polyisocyanate.

2. The ethylenically unsaturated polyurethane of claim 1 wherein the (meth)acryloyl groups are formed from a hydroxyalkyl ester of acrylic or methacrylic acid containing 1 to 8 carbons in the alkyl group.

3. The ethylenically unsaturated polyurethane of claim 2 wherein said hydroxyalkyl ester of acrylic or methacrylic acid comprises 2-hydroxyethyl acrylate and/or 2-hydroxyethyl methacrylate.

4. The ethylenically unsaturated polyurethane of claim 1 wherein said aliphatic polyisocyanate is an aliphatic diisocyanate having 4 to 12 carbon atoms.

5. The ethylenically unsaturated polyurethane of claim 2 wherein said aliphatic polyisocyanate is an aliphatic diisocyanate having 4 to 12 carbon atoms.

6. The ethylenically unsaturated polyurethane of claim 3 wherein said aliphatic polyisocyanate is an aliphatic diisocyanate having 4 to 12 carbon atoms.

7. The ethylenically unsaturated polyurethane of claim 1 wherein said aliphatic polyisocyanate comprises 1,6-hexamethylene diisocyanate.

8. The ethylenically unsaturated polyurethane of claim 2 wherein said aliphatic polyisocyanate comprises 1,6-hexamethylene diisocyanate.

9. The ethylenically unsaturated polyurethane of claim 3 wherein said aliphatic polyisocyanate comprises 1,6-hexamethylene diisocyanate.

10. An ethylenically unsaturated polyurethane which is substantially free from isocyanate groups and has
    a) a total content of (meth)acryloyl groups (calculated as C=C, MW 24) of 3 to 15% by weight.
    b) an allophanate group content (calculated as $N_2C_2HO_3$, MW 101) of 3 to 15% by weight and
    c) an isocyanurate group content (calculated as $N_3,C_3, O_3$, MW 126) of up to 18% by weight, in which the allophanate and isocyanurate groups are prepared from an aliphatic polyisocyanate.

11. The ethylenically unsaturated polyurethane of claim 10 wherein the (meth)acryloyl groups are formed from a hydroxyalkyl ester of acrylic or methacrylic acid containing 1 to 8 carbons in the alkyl group.

12. The ethylenically unsaturated polyurethane of claim 11 wherein said hydroxyalkyl ester of acrylic or methacrylic acid comprises 2-hydroxyethyl acrylate and/or 2-hydroxyethyl methacrylate.

13. The ethylenically unsaturated polyurethane of claim 10 wherein said aliphatic polyisocyanate is an aliphatic diisocyanate having 4 to 12 carbon atoms.

14. The ethylenically unsaturated polyurethane of claim 11 wherein said aliphatic polyisocyanate is an aliphatic diisocyanate having 4 to 12 carbon atoms.

15. The ethylenically unsaturated polyurethane of claim 12 wherein said aliphatic polyisocyanate is an aliphatic diisocyanate having 4 to 12 carbon atoms.

16. The ethylenically unsaturated polyurethane of claim 10 wherein said aliphatic polyisocyanate comprises 1,6-hexamethylene diisocyanate.

17. The ethylenically unsaturated polyurethane of claim 11 wherein said aliphatic polyisocyanate comprises 1,6-hexamethylene diisocyanate.

18. The ethylenically unsaturated polyurethane of claim 12 wherein said aliphatic polyisocyanate comprises 1,6-hexamethylene diisocyanate.

19. The ethylenically unsaturated polyurethane of claim 10 which has a total content of (meth)acryloyl groups of 5 to 15% by weight and an allophanate group content of 5 to 15% by weight.

20. A one-component coating composition which comprises the ethylenically unsaturated polyurethane of claim 1.

* * * * *